United States Patent
Choi et al.

(10) Patent No.: US 10,423,163 B2
(45) Date of Patent: Sep. 24, 2019

(54) MOBILE ROBOT AND METHOD OF CONTROLLING SAME

(71) Applicant: LG ELECTRONICS INC., Seoul (KR)

(72) Inventors: Hyukdoo Choi, Seoul (KR); Hyeongshin Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/735,062

(22) PCT Filed: Jun. 3, 2016

(86) PCT No.: PCT/KR2016/005904
§ 371 (c)(1),
(2) Date: Dec. 8, 2017

(87) PCT Pub. No.: WO2016/200098
PCT Pub. Date: Dec. 15, 2016

(65) Prior Publication Data
US 2019/0072975 A1     Mar. 7, 2019

(30) Foreign Application Priority Data
Jun. 12, 2015     (KR) ........................ 10-2015-0083577

(51) Int. Cl.
*B25J 11/00*     (2006.01)
*A47L 9/28*     (2006.01)
(Continued)

(52) U.S. Cl.
CPC ............ *G05D 1/0234* (2013.01); *A47L 9/009* (2013.01); *A47L 9/28* (2013.01); *A47L 9/2826* (2013.01);
(Continued)

(58) Field of Classification Search
USPC ............................................. 701/28
See application file for complete search history.

(56) References Cited

U.S. PATENT DOCUMENTS

| | | |
|---|---|---|
| 5,525,883 A | 6/1996 | Avitzour |
| 2004/0016077 A1 | 1/2004 | Song et al. |

(Continued)

FOREIGN PATENT DOCUMENTS

| | | |
|---|---|---|
| GB | 2 513 912 | 11/2014 |
| JP | 2004-303137 | 10/2004 |

(Continued)

OTHER PUBLICATIONS

International Search Report (with English Translation) and Written Opinion dated Aug. 24, 2016 issued in Application No. PCT/KR2016/005904.

(Continued)

*Primary Examiner* — Tan Q Nguyen
(74) *Attorney, Agent, or Firm* — KED & Associates, LLP (57) ABSTRACT

A moving robot includes a main body, a driving unit moving the main body, a camera installed on one side of the main body and capturing an image related to a marker, a memory storing information related to a pattern of the marker, and a controller extracting information related to at least one longitudinal line segment included in an appearance of the marker from the captured image, detecting information related to a position and a posture of the main body on the basis of the extracted information related to at least one of the longitudinal line segment and the pattern, and controlling the driving unit on the basis of at least one of the detected position and posture of the main body.

20 Claims, 8 Drawing Sheets

(51) Int. Cl.
  *G05D 1/02* (2006.01)
  *B25J 5/00* (2006.01)
  *B25J 9/00* (2006.01)
  *B25J 9/16* (2006.01)
  *B25J 19/02* (2006.01)
  *A47L 9/00* (2006.01)
  *A47L 11/40* (2006.01)
  *G05D 1/00* (2006.01)

(52) U.S. Cl.
  CPC ......... *A47L 9/2852* (2013.01); *A47L 11/4061* (2013.01); *B25J 5/00* (2013.01); *B25J 5/007* (2013.01); *B25J 9/00* (2013.01); *B25J 9/16* (2013.01); *B25J 9/1664* (2013.01); *B25J 9/1697* (2013.01); *B25J 11/00* (2013.01); *B25J 11/0085* (2013.01); *B25J 19/02* (2013.01); *G05D 1/0088* (2013.01); *G05D 1/0225* (2013.01); *G05D 1/0246* (2013.01); *A47L 2201/04* (2013.01); *G05D 2201/0203* (2013.01)

(56) References Cited

U.S. PATENT DOCUMENTS

| | | | |
|---|---|---|---|
| 2004/0062419 | A1 | 4/2004 | Roh et al. |
| 2006/0293810 | A1* | 12/2006 | Nakamoto ........... G05D 1/0234 701/28 |
| 2014/0316252 | A1 | 10/2014 | Kwak et al. |
| 2015/0115876 | A1 | 4/2015 | Noh et al. |
| 2015/0118576 | A1* | 4/2015 | Chiga ................. H01M 10/052 429/331 |
| 2016/0143500 | A1* | 5/2016 | Fong ................... G05D 1/0274 15/319 |
| 2016/0298970 | A1* | 10/2016 | Lindhe ................ G05D 1/0248 |
| 2018/0065253 | A1* | 3/2018 | Williams ............. G05D 1/0274 |
| 2018/0156833 | A1* | 6/2018 | Griebel ................ B01L 3/0275 |
| 2018/0199784 | A1* | 7/2018 | Schnittman ............. A47L 9/106 |

FOREIGN PATENT DOCUMENTS

| | | |
|---|---|---|
| KR | 10-0483548 | 4/2005 |
| KR | 10-2006-0129960 | 12/2006 |
| KR | 10-2014-0126473 | 10/2014 |
| KR | 10-2015-0050161 | 5/2015 |

OTHER PUBLICATIONS

Extended European Search Report dated Jan. 3, 2019 issued in Application 16807738.6.

* cited by examiner

MOBILE ROBOT AND METHOD OF CONTROLLING SAME

CROSS-REFERENCE TO RELATED PATENT APPLICATIONS

This application is a U.S. National Stage Application under 35 U.S.C. § 371 of PCT Application No. PCT/KR2016/005904, filed Jun. 3, 2016, which claims priority to Korean Patent Application No. 10-2015-0083577, filed Jun. 12, 2015, whose entire disclosures are hereby incorporated by reference.

TECHNICAL FIELD

The present disclosure relates to a moving robot and a method for controlling the same, and particularly, to a moving robot performing marker recognition and a method for controlling the same.

BACKGROUND ART

In general, robots have been developed for an industrial purpose and have been in charge of part of factory automation. Recently, robot-applied fields have further extended to develop medical robots or aerospace robots, and household robots that may be used in ordinary homes have also been made.

A typical example of household robots is a robot cleaner, which is a sort of a home appliance which performs cleaning by sucking dust or foreign matter around the robot, while traveling in a predetermined area. Such a robot cleaner generally includes a rechargeable battery and has an obstacle sensor which may avoid an obstacle during traveling so that the robot cleaner may perform cleaning, while traveling.

Recently, beyond performing cleaning while robot cleaners simply autonomously travel in a cleaning area, research into utilization of robot cleaners in various fields such as healthcare, smart home, remote control, and the like, has been actively conducted.

DISCLOSURE

Technical Problem

Therefore, an aspect of the detailed description is to provide a moving robot capable of performing marker recognition in various directions and a control method thereof.

Another aspect of the detailed description is to provide a moving robot capable of performing marker recognition using a low-resolution camera and a control method thereof.

Another aspect of the detailed description is to detect a position and a posture of a moving robot by performing marker recognition on a cylindrical marker.

Technical Solution

In an aspect, a moving robot according to an embodiment of the present disclosure includes: a main body; a driving unit moving the main body; a camera installed on one side of the main body and capturing an image related to a marker; a memory storing information related to a pattern of the marker; and a controller extracting information related to at least one longitudinal line segment included in an appearance of the marker from the captured image, detecting information related to a position and a posture of the main body on the basis of the information related to at least one of the extracted longitudinal line segment and the pattern, and controlling the driving unit on the basis of at least one of the detected position and posture of the main body.

The controller may calculate a distance between the marker and the main body on the basis of information related to the pattern and a length of the extracted longitudinal line segment.

The controller may calculate a distance between the marker and the main body using information related to a magnification of the camera together with the extracted longitudinal line segment.

The controller may detect information related to a direction of the direction relative to the marker on the basis of the information related to the pattern and the distance between the extracted longitudinal line segments.

The memory may store information related to a path of the moving robot, and the controller may compare the detected position and posture of the main body and the information related to the path, and control the driving unit on the basis of a comparison result.

The camera may capture an image related to the marker at every preset period, and the controller may update the information related to the detected position and posture of the main body at every preset period.

The controller may extract a portion in which a first color is changed to a second color among pixels included in the image, as a longitudinal edge, and group a portion of the extracted longitudinal edge which satisfies a preset condition to detect the longitudinal line segment.

To achieve these and other advantages and in accordance with the purpose of this specification, as embodied and broadly described herein, a method for controlling a moving robot includes: capturing an image related to a marker; extracting information related to at least one longitudinal line segment included in an appearance of the marker from the captured image; detecting information related to a position of the main body on the basis of information related to at least one of the extracted longitudinal line segment and a pattern of the marker; detecting information related to a posture of the main body on the basis of the information related to at least one of the extracted longitudinal line segment and the pattern of the marker; and controlling a driving unit on the basis of at least one of the detected position and posture of the main body.

The detecting of information related to a position of the main body may include calculating a distance between the marker and the main body on the basis of the information related to the pattern and a length of the extracted longitudinal line segment.

The detecting of information related to a posture of the main body may include detecting information related to a direction of the main body relative to the marker on the basis of the information related to the pattern and the distance between the extracted longitudinal line segments.

Advantageous Effects

According to the present disclosure, by estimating a position and a traveling direction of the moving robot using a simple pattern, the effect of maintaining the performance related to the pattern recognition, while reducing unit cost of the moving robot, is obtained.

Further, according to the present disclosure, it is possible to recognize the marker in various positions and directions, thereby obtaining an effect of increasing a recognition rate of the marker recognition.

Further, according to the present disclosure, a position and a traveling direction of the moving robot may be more accurately estimated. That is, according to the method for controlling a moving robot according to the present disclosure, coordinates and posture relative to the marker may be accurately estimated.

BEST MODES

Hereinafter, embodiments of the present disclosure will be described in detail with reference to the accompanying drawings. The technical terms used in the present specification are set forth to mention specific embodiments of the present disclosure, and do not intend to define the scope of the present disclosure. As far as not being defined differently, all terms used herein including technical or scientific terms may have the same meaning as those generally understood by an ordinary person skilled in the art to which the present disclosure pertains, and should not be construed in an excessively comprehensive meaning or an excessively restricted meaning.

Figure 1A:
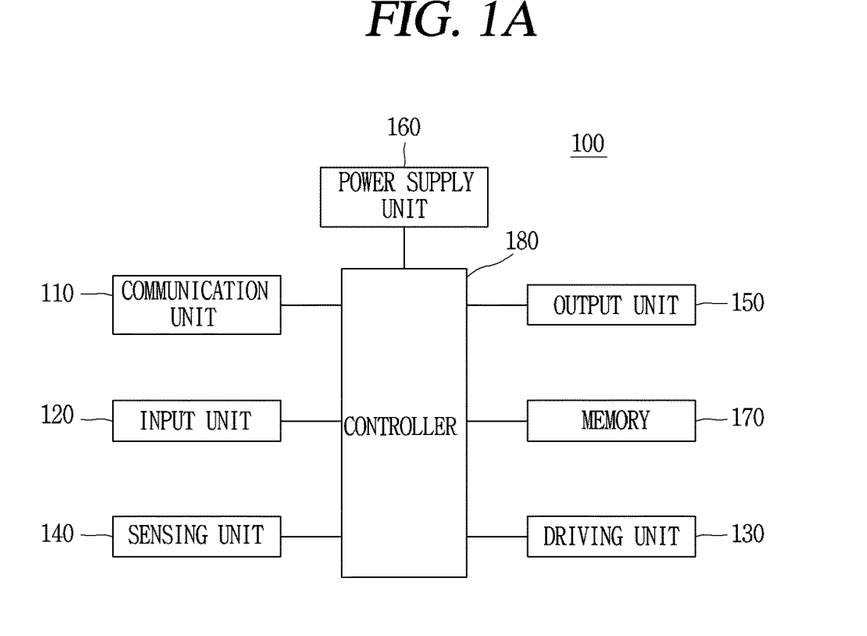
FIG. 1A is a block diagram illustrating a configuration of a moving robot according to an embodiment of the present disclosure.

FIG. 1A illustrates a configuration of a moving robot according to an embodiment of the present disclosure.

As illustrated in FIG. 1A, a moving robot according to an embodiment of the present disclosure may include at least one of a communication unit 110, an input unit 120, a driving unit 130, a sensing unit 140, an output unit 150, a power supply unit 160, a memory 170, a controller 180, or a combination thereof.

Here, the components illustrated in FIG. 1A are not essential, the robot cleaner having components having more components or fewer components may be implemented. Hereinafter, each component will be described.

First, the power supply unit 160 includes a battery that may be charged by an external commercial power source and supplies power to the moving robot. The power supply unit 160 supplies driving power to each of the components included in the moving robot to supply operating power required for the moving robot to travel (or move or run) or perform a specific function.

Here, the controller 180 senses remaining capacity of the battery, and when the remaining capacity is insufficient, the controller 180 controls the moving robot to move to a charging station connected to an external commercial power source, so that the battery may be charged upon receiving a charge current from the charging station. The battery may be connected to a battery sensing unit and a remaining battery capacity and a charging state of the battery may be transmitted to the controller 180. The output unit 150 may display the remaining battery capacity on a screen by the controller 180.

The battery may be positioned on a lower side of the center of the robot cleaner or may be positioned on one of left and right sides of the robot cleaner. In the latter case, the moving robot may further include a balance weight (or a counter weight) in order to resolve weight unbalance of the battery.

Meanwhile, the driving unit 130 may include a motor and drive the motor to rotate left and right main wheels in both directions to rotate or move the main body. The driving unit 130 may move the main body of the moving robot forwards/backwards and leftwards/rightwards, or enable the main body of the moving robot to travel in a curved manner or rotate in place.

Meanwhile, the input unit 120 receives various control commands regarding the robot cleaner from a user. The input unit 120 may include one or more buttons, for example, an OK button, a setting button, and the like. The OK button is a button for receiving a command for checking detection information, obstacle information, position information, and map information from the user, and the setting button may be a button for receiving a command for setting the aforementioned types of information from the user.

Also, the input unit 120 may include an input resetting button for canceling a previous user input and receiving a user input anew, a delete button for deleting a preset user input, a button for setting or changing an operation mode, or a button for receiving a command for returning to the charging station.

Also, the input unit 120 may be installed, as a hard key, a soft key, or a touch pad, in an upper portion of the moving robot. Also, the input unit 120 may have a form of a touch screen together with the output unit 150.

Meanwhile, the output unit 150 may be installed in an upper portion of the moving robot. An installation position or an installation form of the output unit 150 may be varied. For example, the output unit 150 may display a battery state or a traveling scheme.

Also, the output unit 150 may output information regarding a state of an inside of the moving robot detected by the sensing unit 140, for example, a current state of each component included in the moving robot. Also, the output unit 150 may display external state information, obstacle information, position information, and map information detected by the sensing unit 140 on a screen. The output unit 150 may be configured as at least one device among a light emitting diode (LED), a liquid crystal display (LCD), a plasma display panel (PDP), and an organic light emitting diode (OLED).

The output unit 150 may further include an audio output unit audibly outputting an operational process or an operation result of the moving robot performed by the controller 180. For example, the output unit 150 may output a warning sound outwardly according to a warning signal generated by the controller 180.

Here, the audio output unit may be a unit for outputting a sound, such as a beeper, a speaker, and the like, and the output unit 150 may output a sound using audio data or message data having a predetermined pattern stored in the memory 170 through the audio output unit.

Thus, the moving robot according to an embodiment of the present disclosure may output environment information regarding a traveling region on a screen or output it as a sound through the output unit 150. Also, according to another embodiment, the moving robot may transmit map information or environment information to a terminal device through the communication unit 110 such that the terminal device may output a screen or a sound to be output through the output unit 150.

Meanwhile, the communication unit 110 may be connected to the terminal device and/or a different device positioned within a specific region (which will be used together with a "home appliance" in this disclosure) according to one of wired, wireless, and satellite communication schemes to transmit and receive data.

The communication unit 110 may transmit and receive data to and from the different device positioned within the specific region. Here, the different device may be any device as long as it may be connected to a network and transmit and receive data. For example, the different device may be a device such as an air-conditioner, a heating device, an air purifier, a lamp, a TV, an automobile, and the like. Also, the different device may be a sensor sensing a temperature, humidity, atmospheric pressure, a gas, and the like.

Accordingly, the controller 180 may transmit a control signal to the different device through the communication unit 110, so that the different device may operate according to the received control signal. For example, in case where the different device is an air-conditioner, it is possible to turn on power or perform cooling or heating for a specific region according to the control signal, and in case where the different device is a device for controlling a window, it is possible to open or close the window or open the window at a predetermined rate according to the control signal.

In addition, the communication unit 110 may receive various state information, and the like, from at least one different device located in the specific region. For example, the communication unit 110 may receive a set temperature of the air-conditioner, opening and closing information indicating whether the window is opened or closed or a degree of opening or closing the window, a current temperature of a specific region sensed by a temperature sensor, and the like.

Accordingly, the controller 180 may generate a control signal for the different device according to the state information, a user input through the input unit 120, or a user input through a terminal device.

Here, in order to communicate with at least one different device, the communication unit 110 may employ at least one communication method such as radio frequency (RF) communication, Bluetooth, infrared communication (IrDA), wireless LAN (LAN), ZigBee, or the like. Accordingly, the at least one different device and the moving robot 100 may constitute at least one network. Here, the network may be the Internet.

The communication unit 110 may receive a control signal from the terminal device. Accordingly, the controller 180 may perform control commands related to various works according to the control signal received through the communication unit 110. For example, the controller 180 may receive a control command, which may be input from the user through the input unit 120, from the terminal device through the communication unit 110, and the controller 180 may perform the received control command. In addition, the communication unit 110 may transmit state information, obstacle information, location information, image information, map information, and the like, of the moving robot to the terminal device. For example, various pieces of information that may be output through the output unit 150 may be transmitted to the terminal device through the communication unit 110.

Here, in order to communicate with a terminal device such as a laptop computer, a display device, and a mobile terminal (e.g., a smart phone), the communication unit 110 may employ at least one of communication methods such as RF communication, Bluetooth, IrDA, wireless LAN, ZigBee, and the like, and accordingly, the different device and the moving robot 100 may constitute at least one network. Here, the network may be the Internet. For example, when the terminal device is a mobile terminal, the robot cleaner 100 may communicate with the terminal device through the communication unit 110 using a communication method available to the mobile terminal.

Meanwhile, the memory 170 stores a control program controlling or driving the robot cleaner and data corresponding thereto. The memory 170 may store audio information, image information, obstacle information, position information, map information, and the like. Also, the memory 170 may store information related to a traveling pattern.

As the memory 170, a non-volatile memory is commonly used. Here, the non-volatile memory (NVM) (or NVRAM) is a storage device capable of continuously maintaining stored information even though power is not applied thereto. For example, the memory 170 may be a ROM, a flash memory, a magnetic computer storage device (for example, a hard disk or a magnetic tape), an optical disk drive, a magnetic RAM, a PRAM, and the like.

Meanwhile, the sensing unit 140 may include at least one of an external signal sensor, a front sensor, a cliff sensor, a lower camera sensor, and an upper camera sensor.

The external signal sensor may sense an external signal of the moving robot. The external signal sensor may be, for example, an infrared sensor, an ultrasonic sensor, an RF sensor, and the like.

The moving robot may check a position and a direction of the charging station upon receiving a guide signal generated by the charging station using the external signal sensor. Here, the charging station may transmit the guide signal indicating a direction and a distance such that the moving robot may be returned. That is, upon receiving the signal transmitted from the charging station, the moving robot may determine a current position and set a movement direction to return to the charging station.

Also, the moving robot may sense a signal generated by a remote control device such as a remote controller, terminal, and the like, using an external signal sensor.

The external signal sensor may be provided on one side within or outside the moving robot. For example, the infrared sensor may be installed within the moving robot, below the output unit 150, or in the vicinity of the lower or upper camera sensor.

Meanwhile, the front sensors may be installed on a front surface of the moving robot, specifically, on an outer circumferential surface of a side surface of the moving robot, at a predetermined interval. The front sensor may be positioned on at least one side surface of the moving robot to sense an obstacle ahead. The front sensor may sense an object, in particular, an obstacle, present in a movement direction of the moving robot and transfer detection information to the controller 180. That is, the front sensor may sense a protrusion present in a movement path of the moving robot, furnishings, furniture, a wall surface, a wall corner, and the like, in a house, and transmit corresponding information to the controller 180.

The front sensor may be, for example, an infrared sensor, an ultrasonic sensor, an RF sensor, a geomagnetic sensor, and the like, and the moving robot may use a type of sensor or two or more types of sensors together as the front sensor.

For example, in general, the ultrasonic sensor may be mainly used to sense an obstacle in a remote area. The ultrasonic sensor may include a transmission unit and a reception unit. The controller 180 may determine whether an obstacle is present according to whether an ultrasonic wave radiated through the transmission unit is reflected by an obstacle, or the like, and received by the reception unit, and calculate a distance to the obstacle by using an ultrasonic wave radiation time and an ultrasonic wave reception time.

Also, the controller 180 may detect information related to a size of an obstacle by comparing an ultrasonic wave radiated from the transmission unit and an ultrasonic wave received by the reception unit. For example, as a larger amount of ultrasonic waves is received by the reception unit, the controller 180 may determine that a size of the obstacle is larger.

In an embodiment, a plurality of ultrasonic sensors (for example, five ultrasonic sensors) may be installed on an outer circumferential surface of a front side of the moving robot. Here, preferably, the transmission units and the reception units of the ultrasonic sensors may be installed alternately on the front surface of the moving robot.

That is, the transmission units may be disposed on the left and right and spaced apart from the center of the front surface of the main body, and in this case, one or two or more transmission units may be disposed between reception units to form a reception region of an ultrasonic signal reflected from an obstacle, or the like. Due to this disposition, a reception region may be expanded, while the number of sensors is reduced. A transmission angle of ultrasonic waves may be maintained at an angle of a range in which mutually different signals are not affected to prevent a crosstalk phenomenon. Also, reception sensitivity of the reception units may be set to be different.

Also, the ultrasonic sensors may be installed upwardly at a predetermined angle such that ultrasonic waves generated by the ultrasonic sensors are output upwardly, and in this case, in order to prevent the ultrasonic waves from being radiated downwardly, a predetermined blocking member may be further provided.

Meanwhile, as mentioned above, two or more types of sensors may be used as the front sensors, and thus, one or more types of sensor among an infrared sensor, an ultrasonic sensor, and an RF sensor may be used as the front sensors.

For example, the front sensor may include an infrared sensor as a different type of sensor, in addition to the ultrasonic sensor.

The infrared sensor may be installed on an outer circumferential surface of the moving robot together with the ultrasonic sensor. The infrared sensor may also sense an obstacle present in front of or by the side of the moving robot and transmit corresponding obstacle information to the controller 180. That is, the infrared sensor may sense a protrusion present in a movement path of the moving robot, furnishings, furniture, a wall surface, a wall corner, and the like, in a house, and transmit corresponding information to the controller 180. Thus, the moving robot may move within a cleaning area without colliding with an obstacle.

Meanwhile, as the cliff sensor, various types of optical sensors may be used, and the cliff sensor may sense an obstacle of the floor supporting the main body of the moving robot.

That is, the cliff sensor may be installed on a rear surface of the moving robot 100 and may be installed in different regions depending on a type of a moving robot. The cliff sensor may be positioned on a rear surface of the moving robot to sense an obstacle on the floor. The cliff sensor may be an infrared sensor including a light emitting unit and a light receiving unit, an ultrasonic sensor, an RF signal, a position sensitive detector (PSD) sensor, and the like, like an obstacle sensor.

For example, any one of cliff sensors may be installed on the front side of the moving robot, and the other two cliff sensors may be installed on a relatively rear side.

For example, the cliff sensor may be a PSD sensor or may include a plurality of different types of sensor.

The PSD sensor detects the positions of the short and long distances of an incident light with a single p-n junction by using the surface resistance of a semiconductor. The PSD sensor includes a 1D PSD sensor that detects light on a single axis and a 2D PSD sensor that may detect the position of light on the surface, and they have a pin photodiode structure. The PSD sensor is a type of infrared sensor which transmits an infrared ray to an obstacle and measures an angle between the infrared ray transmitted to the obstacle an infrared ray returned after being reflected from the obstacle, thus measuring a distance therebetween. That is, the PSD sensor calculates a distance to the obstacle using triangulation.

The PSD sensor includes a light emitting unit emitting infrared light to an obstacle and a light receiving unit receiving infrared light returned after being reflected from the obstacle. In general, the PSD sensor is formed as a module. In a case in which an obstacle is sensed by using the PSD sensor, a stable measurement value may be obtained regardless of difference in reflectivity or color of the obstacle.

The controller 180 may measure an angle between an infrared light emitting signal irradiated by the cliff sensor toward the floor and a reflection signal received after being reflected from the obstacle to sense a cliff, and analyze a depth thereof.

Meanwhile, the controller 180 may determine whether the moving robot may be able to pass through a cliff according to a floor state of the cliff sensed by using the cliff sensor. For example, the controller 180 may determine whether a cliff is present and a depth of the cliff through the cliff sensor and only when a reflection signal is sensed by the cliff sensor, the controller 180 allows the moving robot to pass through the cliff.

In another example, the controller 180 may determine whether the moving robot is lifted using the cliff sensor.

Meanwhile, the lower camera sensor is provided on a rear surface of the moving robot to acquire image information on a lower side, i.e., a bottom surface (or a surface to be cleaned (i.e., a target cleaning surface)) during movement. The lower camera sensor is also referred to as an optical flow sensor in other words. The lower camera sensor converts an image of a lower side input from the image sensor provided in the sensor to generate image data of a predetermined format. The generated image data may be stored in the memory 170.

The lower camera sensor may further include a lens (not shown) and a lens adjusting unit (not shown) for adjusting the lens. As the lens, a pan-focus type lens having a short focal length and a deep depth may be used. The lens adjusting unit includes a predetermined motor and a moving unit for moving the lens back and forth to adjust the lens.

Also, one or more light sources may be installed to be adjacent to the image sensor. One or more light sources irradiate light to a predetermined region of the floor captured by the image sensor. Namely, in a case in which the moving robot moves a cleaning region along the floor, when the floor is smooth, a predetermined distance is maintained between the image sensor and the floor. On the other hand, in a case in which the moving robot moves on the floor which is uneven, the image sensor may become away from the floor by a predetermined distance or greater due to depressions and protrusions and an obstacle of the floor. In this case, the one or more light sources may be controlled by the controller 180 such that an amount of irradiated light may be adjusted. The light sources may be a light emitting device, for example, a light emitting diode (LED), or the like, whose amount of light may be adjusted.

The controller 180 may detect a position of the moving robot regardless of whether the moving robot slides by using the lower camera sensor. The controller 180 may compare and analyze image data captured by the lower camera sensor over time to calculate a movement distance and a movement direction, and calculate a position of the moving robot on the basis of the calculated movement distance and the calculated movement direction. By using the image information regarding the lower side of the moving robot using the lower camera sensor, the controller 180 may perform correction resistant to sliding with respect to a position of the moving robot calculated by other means.

Meanwhile, an upper camera sensor may be installed to face upwards or forwards to capture images around the moving robot. In case where the moving robot includes a plurality of upper camera sensors, the camera sensors may be formed provided on an upper surface or a side surface of the moving robot at a predetermined distance or at a predetermined angle.

The upper camera sensor may further include a lens for focusing a subject, an adjusting unit for adjusting the camera sensor, and a lens adjusting unit for adjusting the lens. As the lens, a wide angle lens is used to image all surrounding areas, for example, all areas of the ceiling, even at a predetermined position. For example, the lens may include a lens having a predetermined angle of view, for example, 160° or greater.

The controller 180 may generate map information using obstacle information detected by the front sensor, the obstacle sensor, and the like, and the position recognized by the upper camera sensor. Alternatively, the map information may not be generated by the controller 180 but may be received from the outside and stored in the memory 170.

In an embodiment, the upper camera sensor may be installed to face the front of the moving robot. In addition, an installation direction of the upper camera sensor may be fixed or may be changed by the controller 180.

Figure 1B:
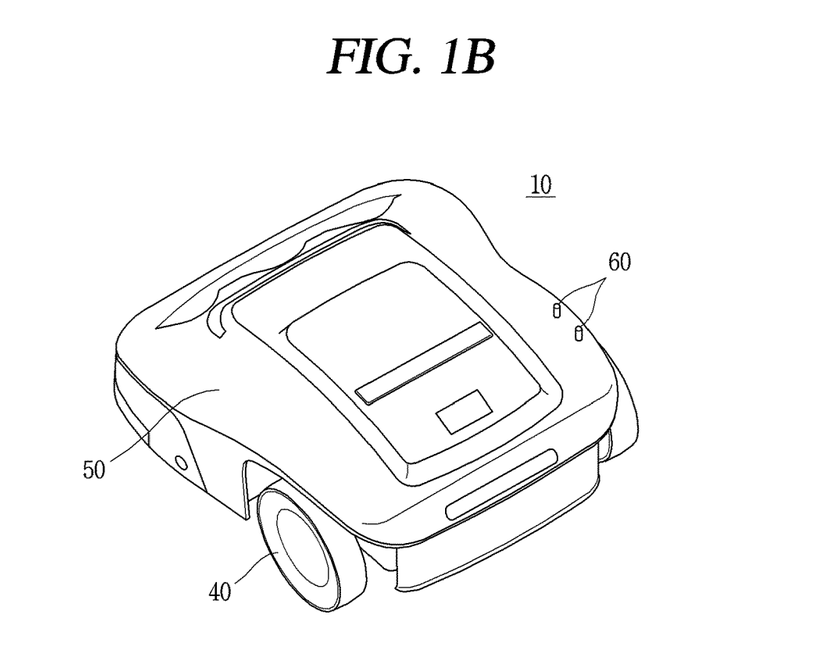
FIG. 1B is a perspective view illustrating an appearance of a moving robot according to an embodiment of the present disclosure.

FIG. 1B illustrates an appearance of a moving robot according to an embodiment of the present disclosure.

Referring to FIG. 1B, the moving robot 100 may include a main body 50 provided to be movable. For example, when the moving robot 100 is a robot cleaner, the main body 50 may include a cleaning unit (not shown) for generating a suction force. In another example, when the moving robot 100 is a lawn mower, the main body 50 may include a cutting part (not shown) for cutting grass.

The main body 50 has a driving unit which may move and rotate the main body 50 in a desired direction. The driving unit may include a plurality of rotatable wheels, and each wheel may be individually rotatable so that the body 50 may be rotated in a desired direction. In detail, the driving unit may include at least one main driving wheel 40 and a auxiliary wheel (not shown). For example, the main body 50 may include two main driving wheels 40, and the main driving wheels may be installed on a lower surface of a rear side of the main body 50.

The main body 50 may include a sensor capable of sensing a boundary wire (not shown) defining an outer circumference of a traveling region of the moving robot. The sensor may sense a magnetic field generated by a current flowing in the boundary wire and a voltage value induced thereby to determine whether the main body 50 has reached the boundary wire or whether the main body 50 has reached the boundary wire Whether or not the main body 50 is traveling along the boundary wire, and the like.

The sensor senses a magnetic field generated by a current flowing in the boundary wire and a voltage value induced thereby to determine whether the main body 50 has reached the boundary wire or whether the main body 50 is within a surface of a closed curve formed by the boundary wire, or whether the main body 50 is traveling along the boundary wire, and the like.

In addition, the sensor may detect various information related to a movement distance of the main body 50, a movement speed of the main body 50, the relative positional change according to movement, and the like.

The main body 50 may drive the driving wheel 40 using information sensed by the sensor. That is, the controller 20 may control driving of the main body 50 using the information measured by the sensor, to drive the driving unit so that the main body 50 is positioned inside a working area.

The main body 50 includes a sensor for sensing a voltage value derived from the boundary wire and the controller 20 for determining a distance between the main body 50 and the boundary wire according to the voltage value sensed by the sensor.

The main body 50 may include a power receiving unit 60 in contact with the charging device 100 to receive power. The power receiving unit 60 may include at least one terminal. In detail, the terminal may be coupled to an elastic unit (not shown) so as to be movable up and down. The power receiving unit 60 may be installed above any one of the main driving wheels 40 of the driving unit. In addition, the power receiving unit 60 may be installed to be exposed upwardly from the main body 50.

Figure 2A:
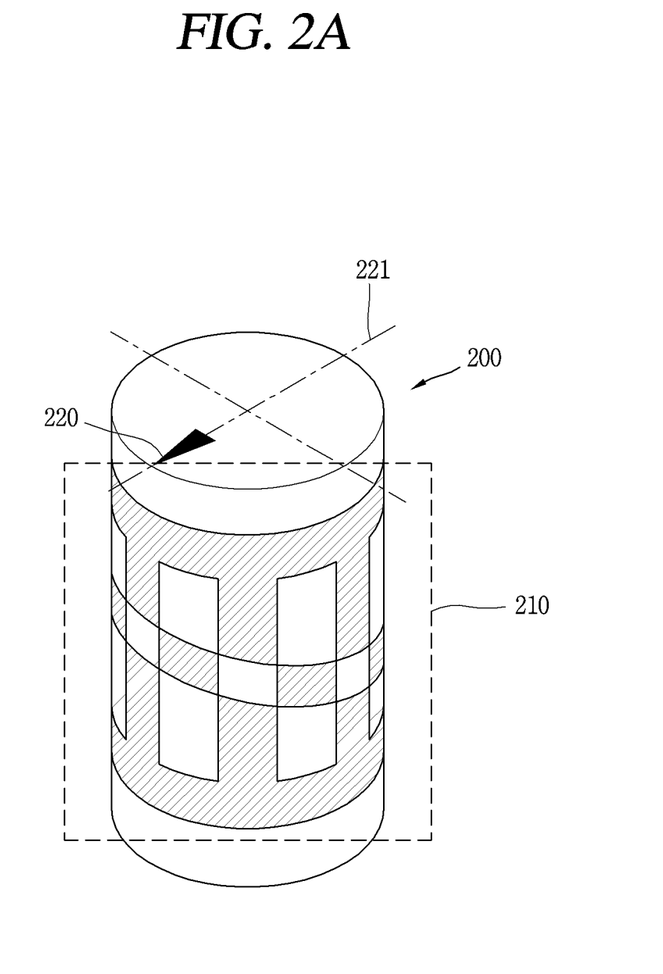
FIG. 2A is a perspective view illustrating an appearance of a marker as a target to be imaged (or an imaging target) of a moving robot according to an embodiment of the present disclosure.

FIG. 2A illustrates a marker as an imaging target of the moving robot according to an embodiment of the present disclosure.

Referring to FIG. 2A, a marker 200 may have a cylindrical shape. An indicator 220 indicating a direction of the marker 200 may be formed on an upper surface of the marker 200. Thus, the marker 200 may be provided such that a direction in which one of coordinate axes of a specific coordinate system 221 is oriented and a direction in which the indicator 220 is oriented correspond to each other.

Also, as illustrated in FIG. 2A, an outer appearance of the marker 200 may be formed in a pattern including at least one of at least one longitudinal line segment and a diagonal line segment.

The pattern may be formed in a simple shape so that it may be recognized although it is not imaged by a highperformance camera. In detail, a plurality of line segments included in the pattern may define a plurality of regions, and the plurality of regions defined in this manner may have a predetermined area value or greater. Also, the number of vertices included in the plurality of defined regions may be equal to or smaller than a predetermined number. In addition, any one of the plurality of defined regions may have any one of the two colors selected by the user.

The pattern on the appearance of the marker 200 will be described in more detail with reference to FIG. 2B hereinafter.

A fixing unit may be provided in a lower portion of the marker 200 and fix a main body and a bottom of the marker 200 such that an installation direction of the marker 200 may not be changed by an external force. In another embodiment, the fixing unit may include a motor, and the installation direction of the marker 200 may be changed according to movement of the motor.

The marker 200 may include a communication unit (not shown), and the communication unit of the marker 200 may perform data transmission/reception with the communication unit 110 of the moving robot 100.

The appearance of the marker 200 is formed as a display unit, and thus, the appearance of the marker 200 may be changed according to an output of the display.

An embodiment of the pattern illustrated in the appearance of the marker 200 will be described with reference to FIG. 2B. FIG. 2B shows the pattern 210 of the cylindrical marker 200 illustrated on a two-dimensional plane.

The pattern 210 according to the present disclosure may be formed of a plurality of longitudinal line segments and diagonal line segments. Further, the pattern 210 may be divided into a plurality of regions by a plurality of longitudinal line segments and diagonal line segments. Any one of the plurality of regions may be formed in a different color from that of an adjacent region. In addition, any one of the plurality of regions may be formed of any one of the two colors selected by the user.

The pattern 210 in two colors may include a first edge 211 (WB) and a second edge 212 (BW). For example, if the two colors are black and white, the first edge 211 may correspond to a portion changing from white to black, and the second edge 212 may correspond to a portion changing from black to white. In this case, a reference direction related with the first and second edges may be oriented from the left to the right of the pattern 210.

In addition, the pattern 210 may include a longitudinal line segment 213. When the definition of the first and second edges is considered, the longitudinal line segment 213 may be formed by continuously connecting the first and second edges.

In addition, the information related to the pattern 210 may include a specific angle value 214 corresponding to each of the longitudinal line segments. For example, the vertical line segment 213 may correspond to the indicator 220, and 0° may be assigned to the longitudinal line segment corresponding to the indicator 220 (See FIG. 2A).

In addition, the information associated with the pattern 210 may include information associated with an edge included in each longitudinal segment. In detail, the information associated with the pattern 210 may include information related to at least one of the number of edges included in each longitudinal line segment, a length d1 of each edge, and a type of each edge, and the like.

Figure 2B:
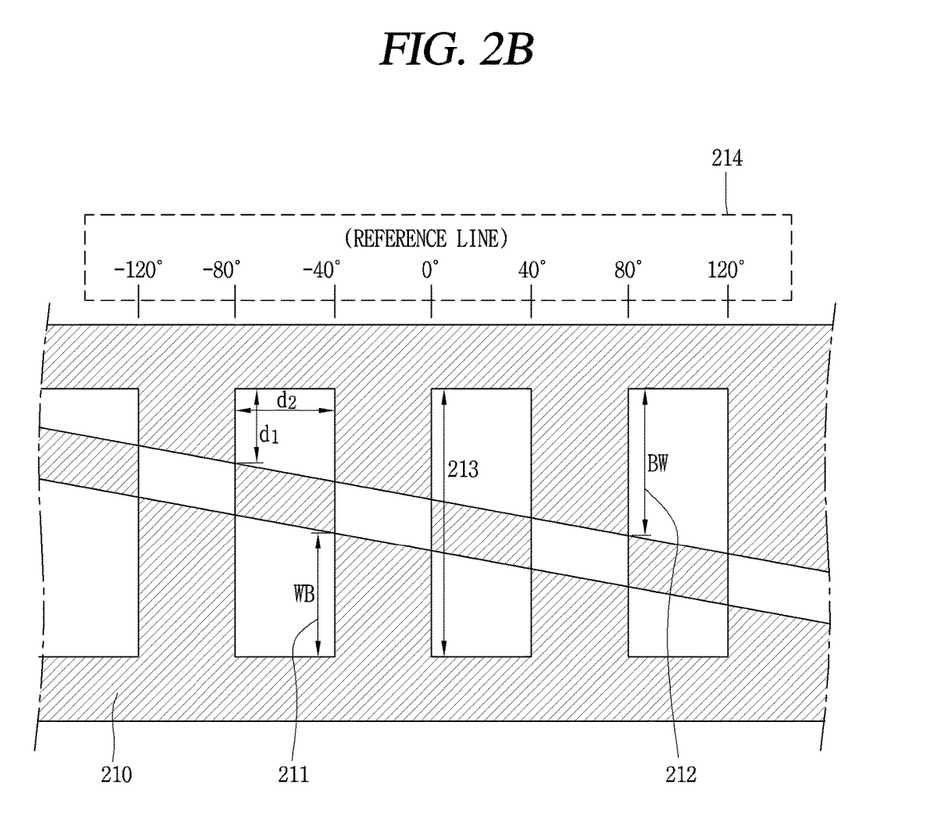
FIG. 2B is a conceptual view illustrating an appearance of the marker illustrated in FIG. 2A on a two-dimensional plane.

Referring to FIG. 2B, the controller 180 may extract a longitudinal line segment from an image related to the pattern 210 on the basis of the information related to the pattern 210, and detect a direction in which the extracted longitudinal line segment is present on the basis of the specific coordinate axes 221 on the surface of the marker 200.

Information related to the pattern 210 stored in the memory 170 may be formed in a table format including information related to an angle corresponding to each longitudinal line segment, a length of an edge, and the like.

Also, as illustrated in FIG. 2B, a plurality of longitudinal line segments included in the pattern 210 may be arranged at every specific interval d2.

Figure 2C:
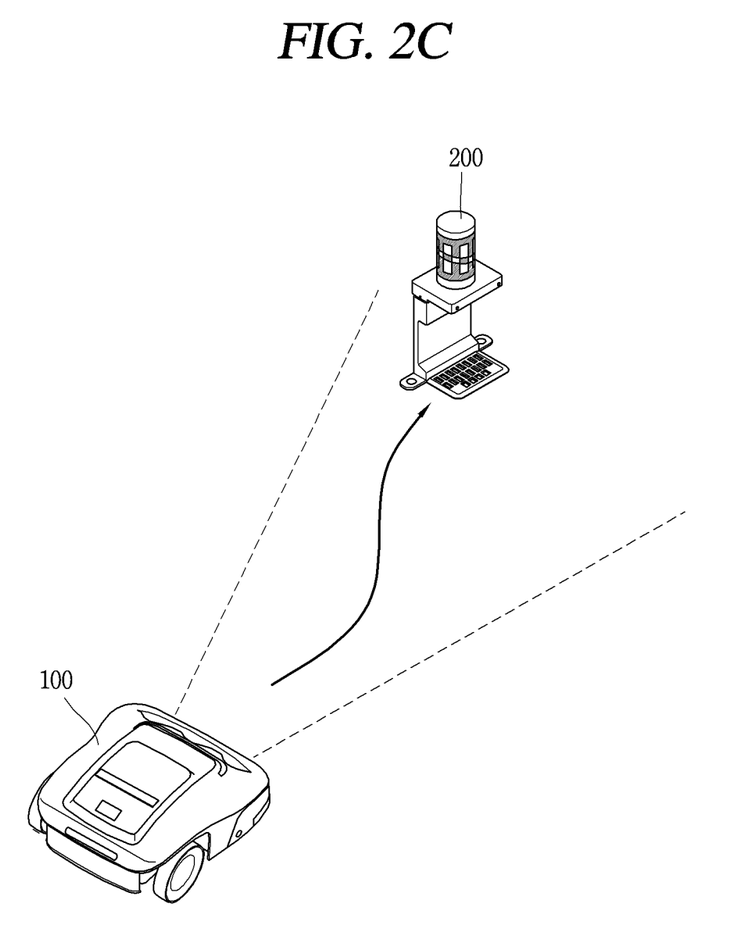
FIG. 2C is a conceptual view illustrating an embodiment related to the moving robot recognizing the marker illustrated in FIG. 2A.

FIG. 2C illustrates an embodiment in which the moving robot 100 recognizes the marker 200 and returns to the charging station.

As illustrated in FIG. 2C, the moving robot 100 may acquire an image related to the marker 200 and detect information related to a position and posture relative to the marker 200. Accordingly, the moving robot 100 may enter a place where the marker 200 is installed, while maintaining a specific posture. For example, a location where the marker 200 is installed may be a place where a charging station of the moving robot 100 is installed. In this case, the memory 170 may store information related to a direction in which the indicator 220 of the marker 200 is oriented and the posture in which the charging station and the moving robot are coupled, and the controller 180 may safely enter the charging station using the stored information and the image related to the marker.

Figure 3:
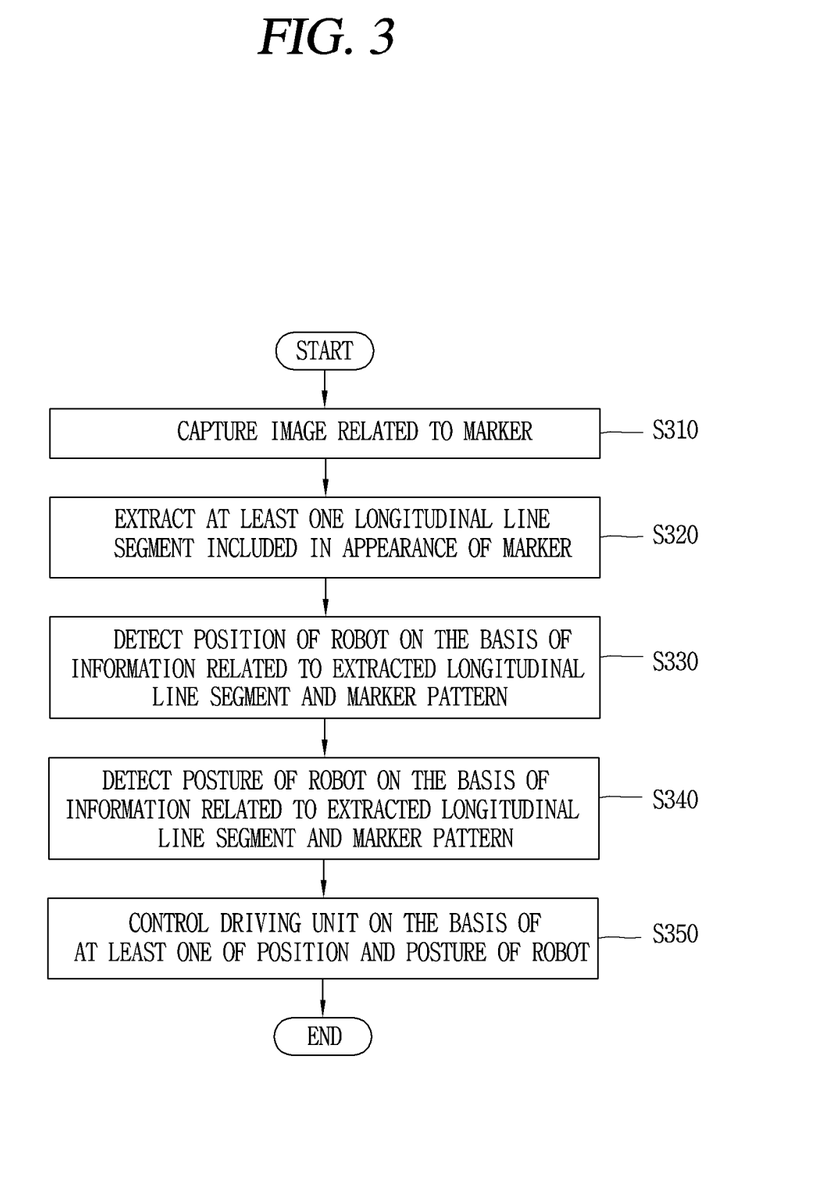
FIG. 3 is a flow chart illustrating a method for controlling a moving robot according to an embodiment of the present disclosure.

FIG. 3 illustrates an embodiment related to a control method of a moving robot according to the present disclosure.

The camera of the moving robot 100 may capture an image related to the marker 200 (S310).

In detail, the camera may be fixedly installed to face a front side or a specific direction of the moving robot 100. In addition, the camera may capture images associated with the marker 200 at every predetermined interval. The controller 180 may perform a function of recognizing a marker on a captured image every time the camera captures an image related to the marker 200.

The controller 180 may extract at least one longitudinal line segment included in the appearance of the marker 200 (S320).

The controller 180 may detect a position of the robot on the basis of the extracted longitudinal line segment and information related to the pattern 210 of the marker 200 (S330).

In detail, the controller 180 may calculate a distance between the marker and the main body on the basis of the information related to the pattern 210 and a length of the extracted longitudinal line segment.

In an embodiment, the information associated with the pattern 210 of the marker 200 may include at least one of an actual distance between longitudinal line segments included in the pattern 210, an angle value corresponding to each of the longitudinal line segments, and a length of each of the longitudinal line segments. In this case, the controller 180 calculates a distance between the main body of the moving robot 100 and the marker 200 by comparing the actual distance between the longitudinal line segments included in the pattern 210 and the length of the extracted longitudinal line segment.

The controller 180 may detect information related to a distance from a lens of the camera to the center of the marker 200 on the basis of a ratio of the actual length of the longitudinal line segments included in the pattern 210 of the marker 200 and the length of the longitudinal line segments extracted from the image related to the marker 200. Also, the controller 180 may estimate the coordinate information related to the current position of the main body 200 on the basis of the coordinate information of the marker 200 stored in the memory 170.

However, if the subject (marker) is imaged by a camera having different attributes, a length of the subject extracted from the captured image may be different although a distance between the subject and the camera lens is the same. Thus, the controller 180 of another embodiment may calculate a distance between the main body and the marker 200 using attributed information of the camera together with the information about the pattern 210 and the length of the extracted longitudinal line segment.

In detail, the controller 180 may calculate the distance between the main body and the marker 200 on the basis of the attributes of the camera installed in the moving robot 100. For example, the attribute information of the camera may include information related to at least one of a magnification of a lens installed in the camera, a focal length of the lens, and a magnification of a captured image.

In addition, the controller 180 may detect a posture of the robot on the basis of the information related to the extracted longitudinal line segment and the pattern 210 of the marker 200 (S340).

The controller 180 may detect information related to a relative direction of the main body with respect to the marker on the basis of the information related to the pattern 210 and the distance between the extracted longitudinal direction line segments. For example, the controller 180 may detect information related to the relative direction of the main body with respect to the marker 200, on the basis of a pixel distance between the extracted longitudinal line segments.

Specifically, the controller 180 may calculate an angle difference between the direction in which the camera lens is oriented and the direction in which the marker 200 is installed, on the basis of the distance between the extracted longitudinal line segments. Also, the controller 180 may also detect information related to the posture of the main body using information related to the direction in which the indicator 220 of the marker 200 is oriented. For example, the information related to the posture of the main body may include information related to the relative direction of the main body with respect to the direction in which the marker 200 is installed.

On the other hand, when the camera captures an image related to the marker at every predetermined period, the controller 180 may update the information related to the detected position and posture of the main body at every predetermined period.

Next, the controller 180 may control the driving unit 130 on the basis of at least one of the position and the posture of the robot (S350).

The controller 180 may detect coordinate information of the current position of the moving robot 100 with respect to preset coordinate axes by performing the line segment extraction step S320, the position detection step S330, and the posture detection step S340.

In addition, the controller 180 may determine whether the moving robot 100 has departed from a traveling route by comparing information related to a traveling route with the coordinate information of the detected current location. When it is determined that the moving robot has departed from the traveling route, the controller 180 may control the driving unit 130 to enter the traveling route of the moving robot 100.

The controller 180 may perform marker recognition at every predetermined period and control the driving unit 130 to perform correction on a posture and position of the moving robot 100 at every predetermined period.

Figure 4A:
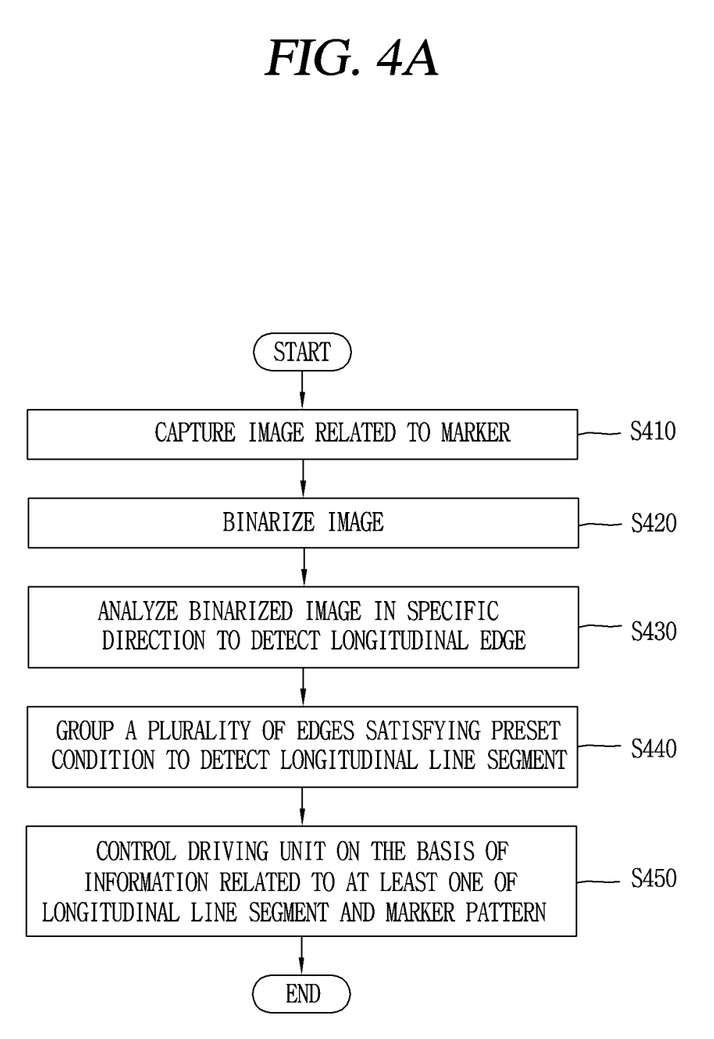
FIG. 4A is a flow chart illustrating a method for controlling a moving robot according to another embodiment of the present disclosure.

FIG. 4A illustrates another embodiment related to a control method of a moving robot according to the present disclosure.

As illustrated in FIG. 4A, the camera may acquire an image associated with the marker (S410).

Figure 4B:
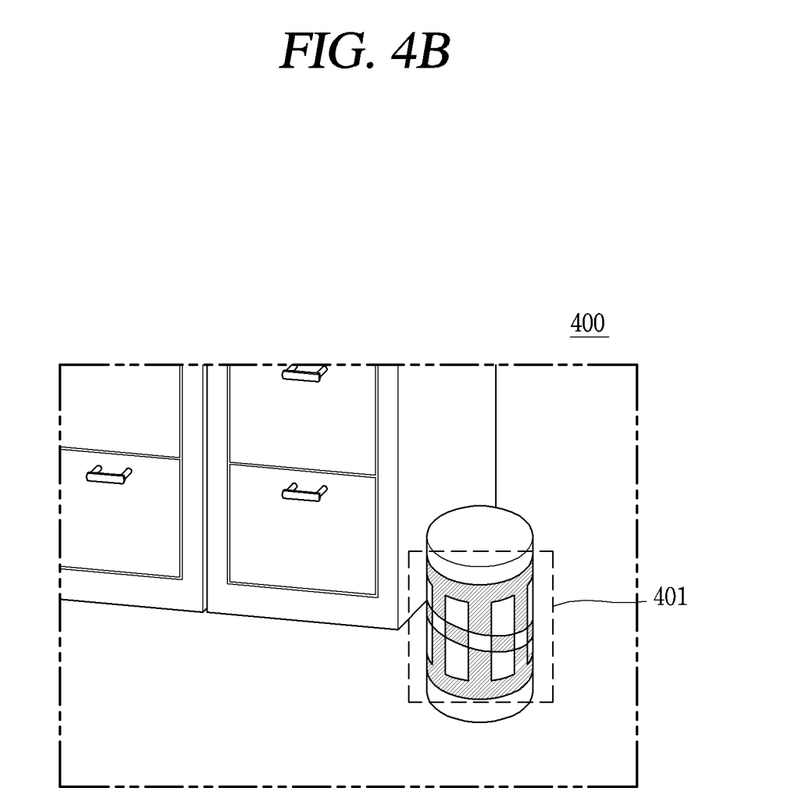
FIG. 4B is a conceptual view illustrating an example of an image captured by a camera of a moving robot according to an embodiment of the present disclosure.

The image associated with the marker acquired by the camera is illustrated in detail in FIG. 4B.

Referring to FIG. 4B, the acquired image 400 may include a portion 401 associated with the marker 200. In addition, the image 400 may include a part related to an object disposed near the marker 200. The controller 180 is required to separately extract the part 401 related to the marker 200 from the acquired image 400 and an extraction method thereof will be described in detail hereinafter.

The controller 180 may binarize the acquired image (S420).

In detail, the controller 180 may extract information related to a color assigned to each pixel of the acquired image 400, and assign a binary number to each pixel on the basis of the extracted color. The controller 180 may perform image analysis using the assigned binary number.

Next, the controller 180 may analyze the binarized image in a specific direction to detect a longitudinal edge (S430).

In detail, the controller 180 may compare colors assigned to contiguous pixels with respect to a horizontal direction of the image 400, and detect a portion of the first color in which the first color is changed to a second color, as the longitudinal edge. In this case, the first and second colors may be two colors included in the appearance of the marker 200.

For example, as illustrated in FIGS. 2B and 4B, the first color may be white and the second color may be black.

In addition, the controller 180 may analyze colors allocated to the pixels from the left side of the image 400 to the right side thereof to detect a first longitudinal edge in which the first color is changed to the second color and a second longitudinal edge in which the second color is changed to the first color. Hereinafter, the first longitudinal edge may be defined as a "WB edge" and the second longitudinal edge may be defined as a "BW edge".

However, the direction for analyzing the first and second colors and the image is not limited to the above-described configuration but may be set according to the pattern 210 of the marker 200.

Next, the controller 180 may detect a longitudinal line segment by grouping a plurality of edges satisfying a predetermined condition (S440).

In detail, in case where a predetermined or greater number of contiguous edges are detected, the controller 180 may group the contiguous edges to detect a longitudinal line segment. For example, the predetermined number may be 3. In another example, the predetermined number may be set by the user.

In addition, when the first BW edge, the first WB edge, and the second BW edge are contiguous, the controller 180 may detect a longitudinal line segment by grouping the contiguous edges. Similarly, when the first WB edge, the first BW edge, and the second WB edge are contiguous, the controller 180 may detect a longitudinal line segment by grouping the contiguous edges.

In addition, when a plurality of longitudinal line segments are detected, the controller 180 may select at least one line segment from among the plurality of detected longitudinal line segments. Also, the controller 180 may extract coordinate information corresponding to a current position of the moving robot 100 using the selected longitudinal line segment.

As described above with reference to FIG. 3, the controller 180 may calculate a distance between the marker and the main body on the basis of the information related to the pattern 210 and the length of the extracted longitudinal line segment.

The controller 180 may also detect information related to a relative direction of the main body with respect to the marker on the basis of the information associated with the pattern 210 and the distance between the extracted longitudinal line segments. For example, the controller 180 may detect information related to a relative direction of the main body with respect to the marker 200, on the basis of a pixel distance between the extracted longitudinal line segments.

Next, the controller 180 may control the driving unit 130 on the basis of the information related to at least one of the longitudinal line segment and the marker pattern (S450).

According to the present disclosure described above, the controller 180 extracts a portion of the image 400 related to the marker 200 and perform a line segment extraction function on the portion of the image 400 related to the marker 200, excluding a portion related to an adjacent object and the bottom of the image 400. Also, since the scheme of forming the pattern 210 of the marker 200 is simple, the acquired image 400 does not need to be a high-resolution image, and thus, the moving robot 100 according to the present disclosure may perform pattern recognition only with the low-priced camera.

Figure 5:
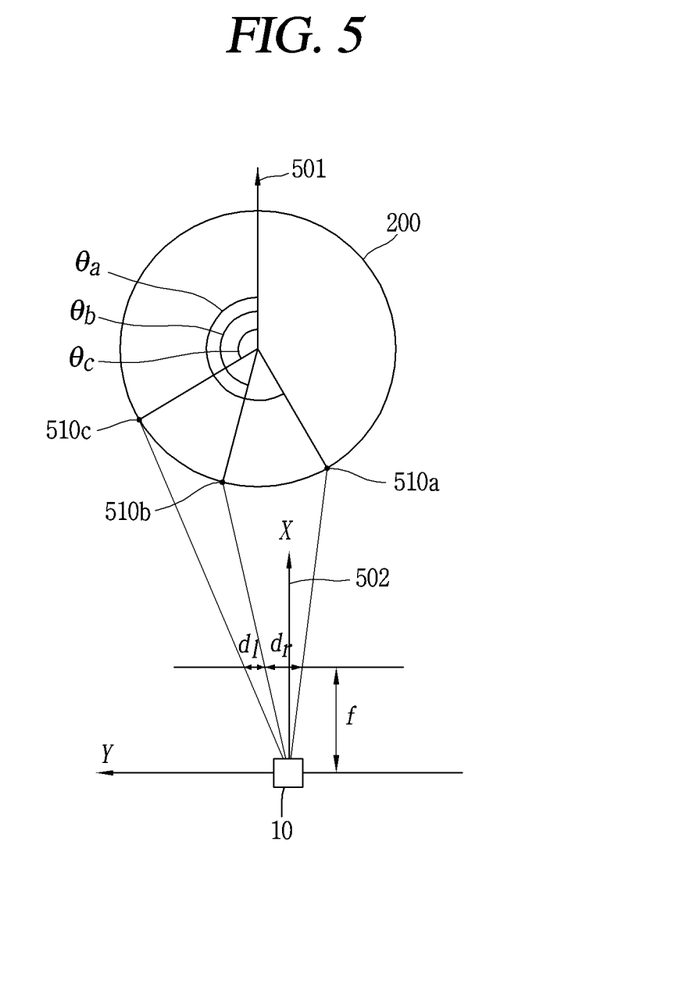
FIG. 5 is a conceptual view illustrating a method for calculating, by a moving robot, coordinates and direction relative to a marker according to an embodiment of the present disclosure.

FIG. 5 illustrates a method for calculating coordinates and directions relative to a marker by the moving robot according to the present disclosure.

Referring to FIG. 5, the camera of the moving robot 100 may capture an image related to the marker 200, while it is oriented in a first direction (X). The controller 180 may extract information related to three longitudinal line segments 510a, 510b and 510c from the image captured by the camera.

The controller 180 may retrieve information related to the extracted longitudinal line segments 510a, 510b, and 510c from the information related to the pattern of the marker 200 stored in the memory 170.

For example, the information related to the longitudinal line segments may include information related to angles θa, θb, and θc formed by the respective longitudinal line segment with respect to a preset reference axis 501 and coordinates of the respective longitudinal line segments. For example, the reference axis 501 may correspond to a direction in which the indicator 220 of the marker 200 is oriented (See FIG. 2A).

In another example, the information related to the longitudinal line segments may include information related to distances dl and dr between the longitudinal line segments extracted from the image acquired by the camera. The distance dl and dr between the extracted longitudinal line segments may correspond to distances between points away by a focal length f from the lens of the camera, on a virtual line connected from the lens of the camera to an actual position of the longitudinal line segment.

The controller 180 may detect a direction X in which the camera is oriented with respect to the reference axis 501 using the information related to the distances dl and dr between the extracted longitudinal line segments and the angles θa, θb, and θc formed by the respective longitudinal line segments with respect to the preset reference axis 501.

Accordingly, the controller 180 may extract information related to a posture of the main body.

According to the present disclosure, by estimating a position and a traveling direction of the moving robot using a simple pattern, the effect of maintaining the performance related to the pattern recognition, while reducing unit cost of the moving robot, is obtained.

Further, according to the present disclosure, it is possible to recognize the marker in various positions and directions, thereby obtaining an effect of increasing a recognition rate of the marker recognition.

Further, according to the present disclosure, a position and a traveling direction of the moving robot may be more accurately estimated. That is, according to the method for controlling a moving robot according to the present disclosure, coordinates and posture relative to the marker may be accurately estimated.

The foregoing embodiments and advantages are merely exemplary and are not to be considered as limiting the present disclosure. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

The invention claimed is:

1. A moving robot comprising:
   a main body;
   a driving unit moving the main body;
   a camera at one side of the main body to capture an image related to a marker;
   a memory that stores information related to a pattern of the marker, the pattern of the marker including at least one longitudinal segment and at least one diagonal line segment that crosses the at least one longitudinal segment; and
   a controller configured to extract, from the captured image, pattern information related to the at least one longitudinal line segment and the at least one diagonal line segment included in an appearance of the pattern of the marker, to detect information related to a position and a posture of the main body based on the pattern information related to the at least one longitudinal line segment, and to control the driving unit based on at least one of the detected information related to the position and the posture of the main body.

2. The moving robot of claim 1, wherein
   the controller calculates a distance between the marker and the main body based on the pattern information related to a length of the at least one longitudinal line segment.

3. The moving robot of claim 2, wherein
   the controller calculates a distance between the marker and the main body using information related to a magnification of the camera and the extracted longitudinal line segment.

4. The moving robot of claim 1, wherein
   the controller detects information related to a direction relative to the marker based on the pattern information related to a distance between the extracted longitudinal line segments.

5. The moving robot of claim 1, wherein
   the memory stores information related to a path of the moving robot, and the controller compares the detected information related to the position and the posture of the main body and the information related to the path, and the controller controls the driving unit based on a result of the comparison.

6. The moving robot of claim 1, wherein
the camera captures, at every preset period, an image related to the marker, and
the controller updates, at every preset period, the detected information related to the position and the posture of the main body.

7. The moving robot of claim 1, wherein
the controller extracts, as a longitudinal edge, a portion of the image associated with the marker, in which a first color is changed to a second color among pixels included in the image, and
the controller groups a portion of the extracted longitudinal edge that satisfies a preset condition to detect the longitudinal line segment.

8. The moving robot of claim 1, wherein
the pattern of the marker includes a plurality of longitudinal line segments and two diagonal line segments.

9. The moving robot of claim 8, wherein
the pattern of the marker is divided into a plurality of regions by the longitudinal line segments and the diagonal line segments.

10. The moving robot of claim 9, wherein
the plurality of regions have a value equal to or greater than a predetermined area value.

11. The moving robot of claim 9, wherein
any one of the plurality of regions is provided in a color different from adjacent ones of the plurality of regions.

12. The moving robot of claim 11, wherein
the plurality of regions are provided in black or white, and any one of the plurality of regions is divided by a first edge and a second edge.

13. The moving robot of claim 12, wherein
the first edge correspond to a portion of the image associated with the marker in which one region provided in white, from among the plurality of regions, is changed to another region provided in black.

14. The moving robot of claim 13, wherein
the pattern of the marker includes the at least one diagonal line segment and the at least one longitudinal line segment, and any one of the at least one longitudinal line segment is formed by connecting at least one first edge and at least one second edge in a crossing manner.

15. The moving robot of claim 14, wherein
the pattern information includes information related to at least one of a number of edges included in each of the longitudinal line segment, a length of each of the edges, and a kind of each of the edges.

16. The moving robot of claim 12, wherein
the second edge correspond to a portion of the image associated with the marker in which one region provided in black, from among the plurality of regions, is changed to another region provided in white.

17. The moving robot of claim 8, wherein
the plurality of longitudinal line segments are separated into a plurality of edges by the diagonal line segment.

18. The moving robot of claim 17, wherein
the controller detects a direction allocated to any one longitudinal line segment based on a length of each of edges separated from any one of the plurality of longitudinal line segments.

19. A method for controlling a moving robot, the method comprising:
capturing an image related to a marker, wherein the marker including at least one line segment and at least one diagonal line segment;
extracting, from the captured image, pattern information related to the at least one longitudinal line segment and the at least one diagonal line segment included in an appearance of the marker;
detecting information related to a position of the main body based on the pattern information related to at least one longitudinal line segment;
detecting information related to a posture of the main body based on the pattern information related to the at least one longitudinal line segment; and
controlling a driving unit based on at least one of the detected information relating to the position and the posture of the main body.

20. The method of claim 19, wherein
the detecting of information related to a position of the main body includes calculating a distance between the marker and the main body based on the pattern information related to a length of the at least one longitudinal line segment.

* * * * *